May 4, 1926.

S. L. CLEVELAND ET AL 1,583,389

CAKE DECORATING MACHINE

Filed Sept. 21, 1925     3 Sheets-Sheet 2

Inventors
S L.Cleveland
R.I.Cleveland
By
Attorney

May 4, 1926.

S. L. CLEVELAND ET AL 1,583,389

CAKE DECORATING MACHINE

Filed Sept. 21, 1925

3 Sheets-Sheet 3

Inventors
S. L. Cleveland
R. I. Cleveland
By C. B. Birkenbeuel
Attorney

Patented May 4, 1926.

1,583,389

UNITED STATES PATENT OFFICE.

SHERMAN L. CLEVELAND AND ROY I. CLEVELAND, OF KELSO, WASHINGTON.

CAKE-DECORATING MACHINE.

Application filed September 21, 1925. Serial No. 57,652.

*To all whom it may concern:*

Be it hereby known that we, SHERMAN L. CLEVELAND, and ROY I. CLEVELAND, citizens of the United States, and residents of Kelso, county of Cowlitz, State of Washington, have invented a new and useful Cake-Decorating Machine, of which the following is a specification.

This invention relates generally to the art of baking and particularly to the decoration of cakes with icing.

The first object of this invention is to provide an exceedingly simple and efficient machine for applying an entire design of icing material to a cake at one operation.

The second object is to enable the baker to make any number of cakes with exactly the same decorations with the expenditure of only a fractional part of the labor which would be ordinarily required.

The third object is to so construct the machine that it can be set up, adjusted or have the design changed by an inexperienced person.

Figure 1:
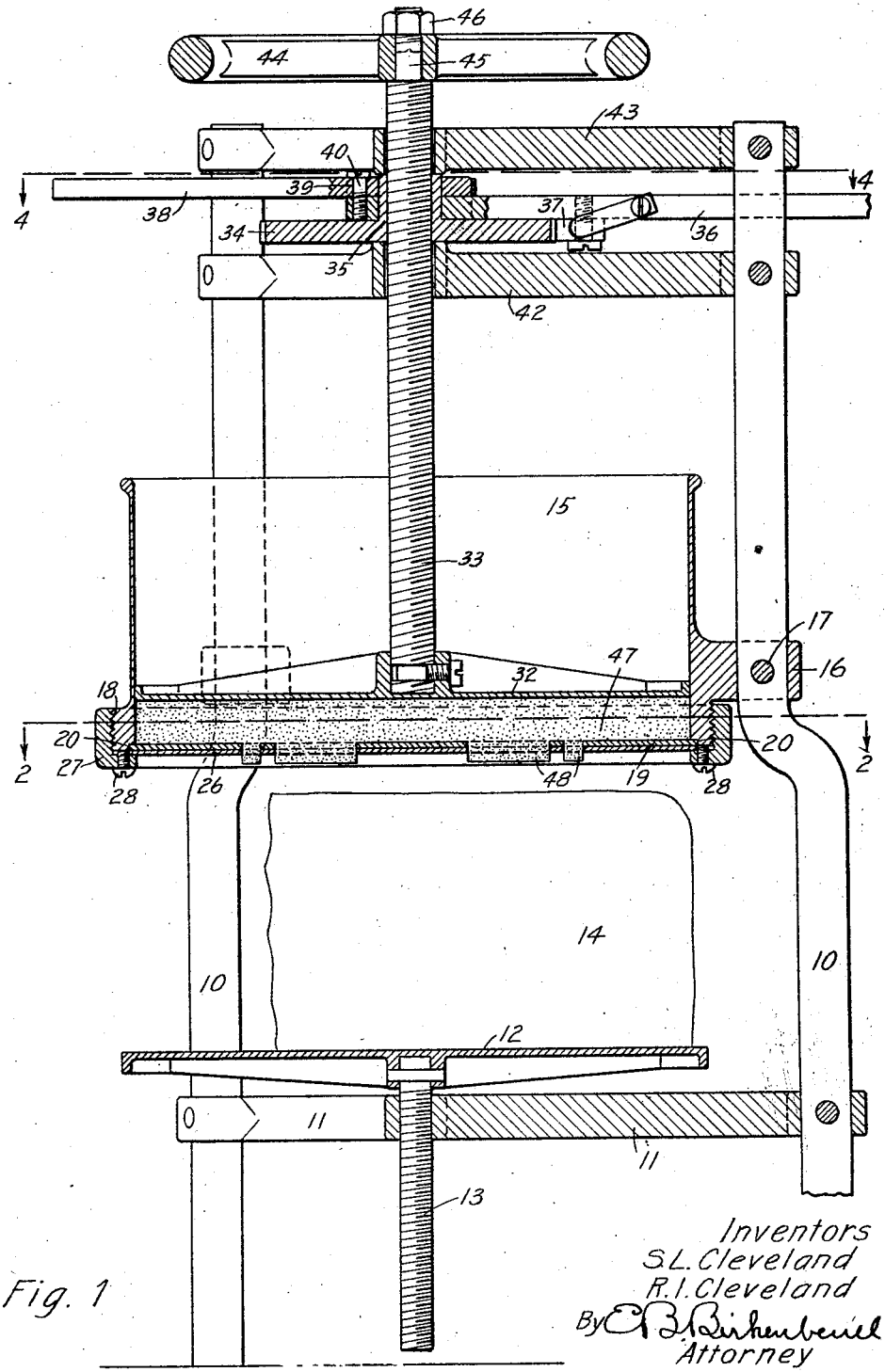
Figure 2:
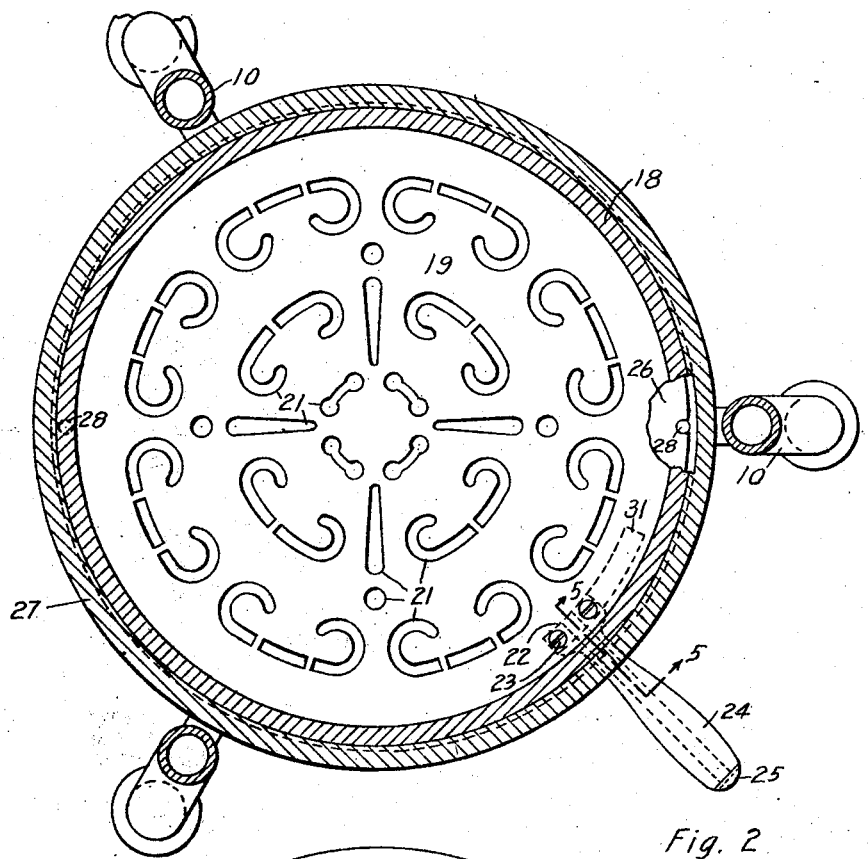
Figure 3:
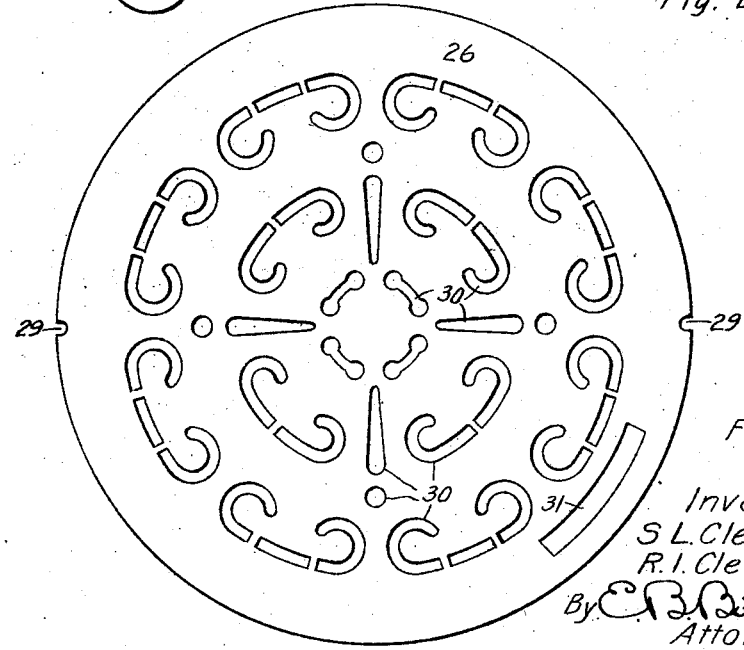
Figure 4:
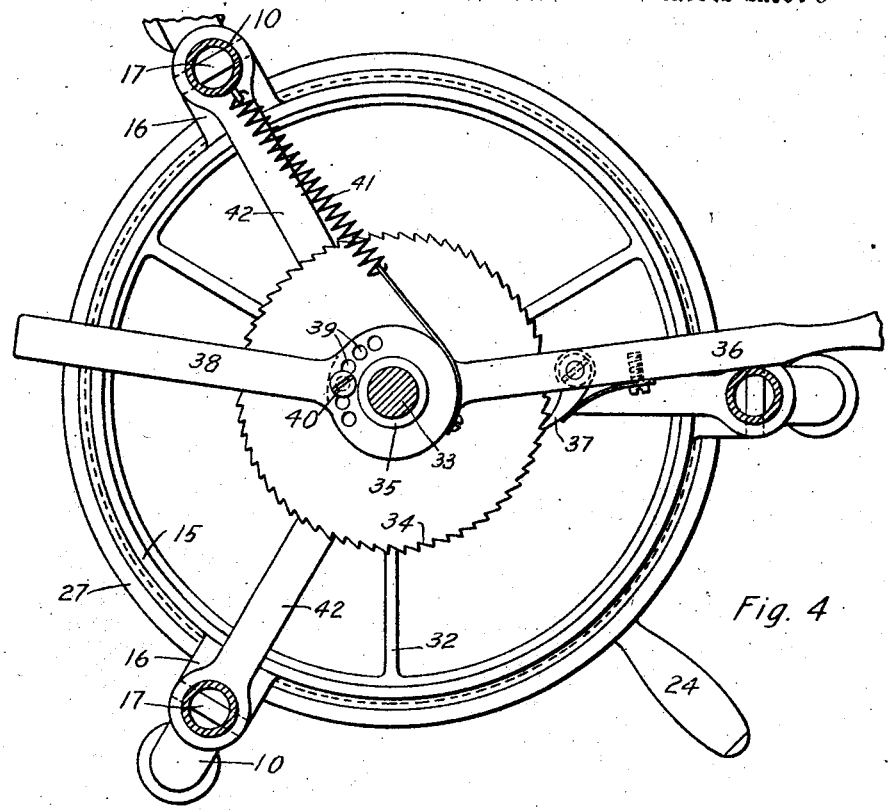
Figure 5:
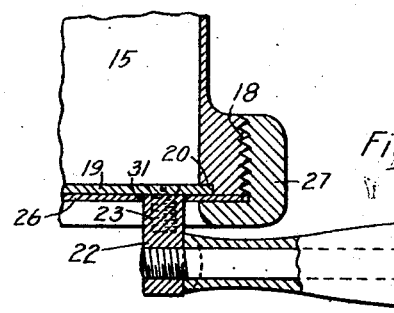
Figure 6:
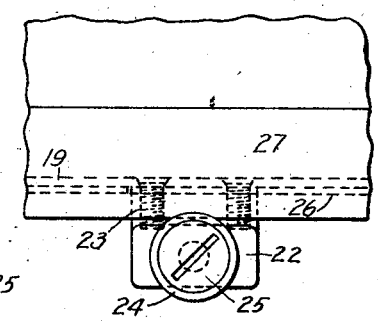
Figure 7:
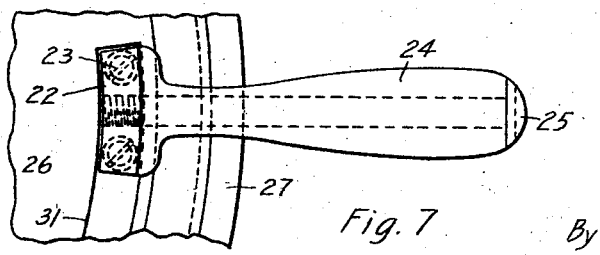

These and other objects, will become more apparent from the specification following as illustrated in the accompanying drawings, in which:

Figure 1 is a vertical section through the machine. Figure 2 is a horizontal section taken along the line 2—2 in Figure 1 showing the upper pattern plate. Figure 3 is a detailed plan of the lower pattern plate. Figure 4 is a horizontal section taken along the line 4—4 in Figure 1. Figure 5 is an enlarged vertical section taken along the line 5—5 in Figure 2. Figure 6 is a front elevation of Figure 5. Figure 7 is a bottom view of Figure 5.

Similar numbers of reference refer to the same parts throughout the several views.

Referring in detail to the drawing, the machine is carried on three upright legs 10. Between the lower ends of the legs 10 is secured a spider 11. A cake table 12 is mounted on the screw 13 which passes through the spider 11. The cake 14 rests on the table 12 while being decorated.

Between the legs 10 and near their middle portions is mounted an icing container 15 whose lugs 16 are secured to the legs 10 by means of the pins 17. A threaded flange 18 is formed around the container 15. Across the bottom of the container 15 is placed a rotatable pattern plate 19 within the recess 20. The plate 19 is provided with cut-out portions 21 which form the design and has secured to its under side a curved block 22 by means of the screws 23. A handle 24 is attached to the block 22 by means of the screw 25.

Under the plate 19 is placed the stationary lower pattern plate 26, which is held against the end of the flange 18 and against the plate 19 by the threaded ring 27. Screws 28 in the ring 27 engage the notches 29 and prevent the plate 26 from turning without the ring 27. Openings 30 which are duplicates of the holes 21 are formed in the plate 26. A slot 31 in the plate 26 is made to freely receive the curved block 22 and to permit sufficient movement of the plate 19 to cut off the icing.

Inside of the container 15 is placed a plunger 32 which is operated by a screw 33. On this screw is placed a ratchet wheel nut 34 on whose hub 35 is loosely mounted a lever 36 which is provided with a spring urged pawl 37 which engages the teeth of the wheel 34.

An arm 38 which is also loose on the hub 35 can be secured to the lever 36 in any of the various holes 39 by means of the screw 40. A spring 41 is attached between one of the legs 10 and the hub of the arm 38 which hub acts as a drum upon which the straight portion of the spring can wind. The spring 41 pulls the parts to a position where the arm 38 will stop against a leg 10. The position shown in Figure 4 is at the completion of a feed stroke just prior to cutting off the icing, after which the parts are returned to rest under the action of the spring 41.

Below the wheel 34 is an under-spider 42 and above it is the upper-spider 43. The two spiders 42 and 43 hold the nut in position. A hand wheel 44 fits on the squared end 45 of the screw 33 and is held in place by the nut 46.

The operation of the machine is as follows: Icing 47 is placed within the container 15 and a cake 14 is placed on a table 12. The plunger 32 is now fed downwardly by the hand wheel 44 until it bears against the icing 47. The handle 36 is now pulled forward as far as possible to the position shown in Figure 4 and then released. The handle 24 is now moved to cut off the icing 48 which is deposited on the cake 14 in the same form which it took when it passed through the pattern plates. The cake is now replaced by another and the operation is repeated as often as is desired. In order to vary the amount of icing deposited at one operation, the arm 38 is moved with relation to the lever 36 under the control of the screw 40.

We are aware that various devices have long been in use for applying icing decorations to cakes. We therefore do not claim such devices broadly but we do intend to cover all such forms and modifications thereof as fall fairly within the appended claim.

We claim:

In a cake decorating machine, the combination of an upright stand; a cake tray adjustably mounted on said stand; an icing container over said tray; a perforated stationary bottom for said container; a similarly perforated but rotatable plate over said bottom adapted to have its holes brought into or out of register with the holes in said stationary bottom; a plunger within said container; a screw for driving said plunger; a ratchet wheel nut on said screw, supports for said screw and nut; a ratchet operating lever for said nut; an adjustable stop for said lever; a hand wheel on said screw; and means for moving said rotatable plate in a manner to sever icing which has passed through the perforations in said bottom from the icing in said container.

SHERMAN L. CLEVELAND.
ROY I. CLEVELAND.